United States Patent
Remael

(10) Patent No.: US 7,181,535 B1
(45) Date of Patent: Feb. 20, 2007

(54) ADDRESSING METHOD AND NAME AND ADDRESS SERVER IN A DIGITAL NETWORK

(75) Inventor: François-Arnaud Remael, Pleumeur Bodou (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/868,731

(22) PCT Filed: Dec. 24, 1999

(86) PCT No.: PCT/FR99/03288

§ 371 (c)(1),
(2), (4) Date: Sep. 14, 2001

(87) PCT Pub. No.: WO00/39980

PCT Pub. Date: Jul. 6, 2000

(30) Foreign Application Priority Data

Dec. 24, 1998 (FR) .................................. 98 16449

(51) Int. Cl.
*G06F 15/16* (2006.01)
*G06F 15/173* (2006.01)

(52) U.S. Cl. ...................................... 709/245; 709/242
(58) Field of Classification Search ................ 709/245, 709/242; 713/200
See application file for complete search history.

(56) References Cited

U.S. PATENT DOCUMENTS

| 5,828,893 | A |   | 10/1998 | Wied et al. |   |
|---|---|---|---|---|---|
| 6,058,431 | A | * | 5/2000 | Srisuresh et al. | 709/245 |
| 6,327,662 | B1 | * | 12/2001 | Araujo | 713/200 |
| 6,381,646 | B2 | * | 4/2002 | Zhang et al. | 709/227 |
| 6,493,765 | B1 | * | 12/2002 | Cunningham et al. | 709/245 |
| 6,701,437 | B1 | * | 3/2004 | Hoke et al. | 726/15 |
| 6,888,837 | B1 | * | 5/2005 | Cunningham et al. | 370/401 |

FOREIGN PATENT DOCUMENTS

WO   WO 99/38303   7/1999

OTHER PUBLICATIONS

Harry Newton, Newton's Telecom Dictionary, Feb. 2002, CMP Books, 18th Edition, p. 235.*
Tsuchiya, et al. "Extending the IP Internet Through Address Reuse." Computer Communication Review, vol. 1, No. 23, (Jan. 1, 1993), pp. 16-33.
Damani, et al. "One-IP: Techniques for Hosting a Service on a Cluster of Machines." Computer Networks and ISDN Systems, vol. 29, No. 8-13, (Sep. 1, 1997), pp. 1019-1027.
Search Report issued by the European Patent Office for International Application No. PCT/FR99/03288 filed on Dec. 24, 1999; report dated Mar. 20, 2000.

* cited by examiner

*Primary Examiner*—William Vaughn
*Assistant Examiner*—Michael Delgado
(74) *Attorney, Agent, or Firm*—Drinker Biddle & Reath LLP

(57) ABSTRACT

In a digital telecommunications network having first and second addressing zones, a name and address server in the first addressing zone receiving from a first address of the first zone, assigned to a source machine, a request to provide an address in relation to the name of a destination machine situated in the second addressing zone, sends to a second address of the first zone a first packet containing at least the said name of destination machine, said second address of the first zone being associated in a static manner to a first address of the second zone, assigned to a management unit. The management unit sends to an interface a second packet destined for the name and address server comprising as origin address, a second address of the second zone assigned to the destination machine. The interface transmits the second packet to the name and address server while replacing the origin address by a third address of the first zone, forming part of a list of addresses of the first zone, forming part of a list of addresses of the first zone allotted to the second addressing zone and associated in a dynamic manner with the second address of the second zone. The name and address server includes this third address in a response to the address provision request returned to the first address of the first zone.

4 Claims, 2 Drawing Sheets

ADDRESSING METHOD AND NAME AND ADDRESS SERVER IN A DIGITAL NETWORK

BACKGROUND OF THE INVENTION

The present invention relates to an addressing method in a digital telecommunications network, as well as to a name and address server implementing such a method.

The invention belongs to the field of the addressing of networked machines. It applies more particularly to a digital telecommunications network having first and second addressing zones, between which an interface unit caters for address translations.

Specifically, if the addressing used in the first zone is different from that used in the second zone, the communication between a source machine situated in one zone and a destination machine situated in the other zone requires in particular the translation of the addresses assigned to these machines, at the level of the interface between the two addressing zones.

IP ("Internet Protocol") addressing, that is to say the address allocation mode used by Internet, is generally an addressing of dynamic type in low-speed on-line networks.

When a customer connects to an Internet service provider, or ISP, which communicates with this customer by means of a private address, the ISP allots an address from a list of public IP addresses which it holds. The customer can then communicate with the public domain by means of the public address which has been allotted to him. As soon as the customer disconnects, the address which had been allotted to him becomes available again for another user.

This organization has hitherto been rendered possible by the fact that the customers of ISPs are often wont to disconnect, on the one hand because the charge is often dependent on the duration of the connections, and on the other hand because these customers wish to free their telephone line so as to be able to be contacted.

However, there is currently a trend to bill at a flat rate rather than as a function of the duration of the connections, so that the number of disconnections will likely tend to diminish.

Furthermore, the customers are no longer necessarily constrained to disconnect in order to free their telephone line, given that there are relatively recent telecommunications techniques allowing the simultaneous use of the telephone service and consultation services. Among these techniques may be cited for example the use of a separate medium such as cable, or else the implementation of ADSL ("Asymmetric Digital Subscriber Line") links.

Within such a context of economic and technical change, customers are no longer likely to suffer the constraint of having to disconnect as often as hitherto. In this case, the use of the aforesaid technique will no longer be suitable for recovering the IP address of a customer with a view to reallocating it.

As a solution for remedying the lack of public addresses, under certain conditions it is possible to use a private addressing, that is to say to allocate the customer a private address and then on exiting the private zone controlled by the ISP to carry out an address translation with the aid of the NAT function.

The NAT or network address translation function, generally installed at a point of exit of the private domain which uses specific local addressing, implements the aforesaid dynamic addressing: it manages a list of public IP addresses and matches a private address of a calling machine with an IP address picked from the list, and performs an address translation in respect of each packet arriving at the NAT point and which travels from the calling machine of the private domain to a contacted machine of the public domain.

Thus, for the contacted machine, everything happens as if the address of the calling machine of the private domain were the public address contained in the list of IP addresses.

The contacted machine therefore responds to the calling machine to this address, and when a response packet arrives at the NAT point, the router effects the translation of the address contained in the list of IP addresses to the destination private address and forwards the packet in the private domain to the calling machine.

A drawback of this addressing mechanism is that it does not allow a machine of the public addressing domain to send a packet to a machine of the private addressing domain without action by the latter machine, since the matching of the addresses is dynamic, hence temporary, and since the private address is unknown to the routing tables.

Furthermore, within the framework of new applications such as Internet telephony, it is currently necessary to possess an IP address in order to be able to be contacted, so that the data packets can be routed to the corresponding machine.

SUMMARY OF THE INVENTION

The aim of the present invention is to alleviate the aforesaid drawbacks by facilitating the establishment of communications from the public domain to the private domain.

To do this, the present invention proposes a method of addressing in a digital telecommunications network having first and second addressing zones between which an interface caters for address translations, comprising the following steps:

a name and address server situated in the first addressing zone receives, originating from a first address of the first zone, assigned to a source machine, a request to provide an address in relation to the name of a destination machine;

if the destination machine is situated in the second addressing zone, the name and address server sends to a second address of the first zone a first packet containing at least the name of the destination machine;

the interface retransmits the first packet to a first address of the second zone, assigned to a management unit and associated in a static manner with the second address of the first zone;

the management unit obtains a second address of the second zone assigned to the destination machine whose name appears in the first packet;

the management unit sends the interface a second packet destined for the name and address server comprising the second address of the second zone as origin address;

the interface transmits the second packet to the name and address server while replacing the origin address by a third address of the first zone, forming part of a list of addresses of the first zone allotted to the second addressing zone and associated in a dynamic manner with the second address of the second zone;

the name and address server receives the second packet, extracts therefrom the third address forming the origin address, and includes this third address in a response to the address provision request returned to the first address of the first zone.

The method thus comprises the association of the NAT function with the conventional functions of a name and address server or DNS ("domain name server"), which functions consist among other things in obtaining the IP address which corresponds to a machine name.

Thus, the present invention allows a source machine of the public addressing zone to establish a connection with a view to communicating with a destination machine of the private addressing zone, by conveying the appropriate names and addresses between the two addressing zones.

The solution proposed consists in maintaining, at the level of the public domain/private domain interface, a static association between the second address of the first zone, that is to say the public address known to the name and address server, and an address of the second zone corresponding to the private address assigned to the management unit.

In a particular embodiment of the method allowing better synchronization, the first packet sent by the name and address server to the second address of the first zone contains, in addition to the name of the destination machine, a sequence number.

In a particular embodiment of the method affording greater security of transmission, the first packet sent by the name and address server to the second address of the first zone contains, in addition to the name of the destination machine, an authentication key.

According to another aspect, in order to achieve the aforesaid aim, the present invention also proposes a name and address server in a digital telecommunications network having first and second addressing zones between which an interface caters for address translations, the said server being situated in the first addressing zone and comprising:

a data storage module for storing associations between machine names and addresses of the first zone; and a data processing module designed to respond to the receipt, originating from a first address of the first zone, of a request for provision of an address in relation to the name of destination machine belonging to the second addressing zone through the transmission to a second address of the first zone of a first packet containing at least the said name of destination machine, and to send back to the said first address, after receipt from the second zone of a second packet containing a third address of the first zone associated in a dynamic manner with a second address of the second zone, a response providing the said third address of the first zone.

The name and address server exhibits in particular the feature of addressing itself systematically to the management unit when it receives a request for addressing to the private addressing zone.

Coupled with the NAT function, the name and address server establishes a match between the private address of the destination machine and a dynamic address emanating from the list of IP addresses and sends back this IP address in the guise of response to the source machine. The source machine can then contact the destination machine.

Neither the name and address server, nor the management unit constitute points of transit of the traffic in the network. Consequently, the structure and manner of operation of these two entities are not apt to create a bottleneck for the traffic.

Furthermore, the invention makes it possible to manipulate a number of IP addresses related, not to the number of customers, but to the number of connections established from the private addressing zone to the public addressing zone.

BRIEF DESCRIPTION OF THE DRAWINGS

Other aspects and advantages of the present invention will become apparent on reading the description which follows of a particular embodiment, given by way of nonlimiting example. The description refers to the drawings which accompany it, in which.

DESCRIPTION OF PREFERRED EMBODIMENTS

By way of nonlimiting example, the present invention will be described here in its application to a network in which the first addressing zone uses so-called "public" IP addresses, in accordance with the address allocation mode used by the Internet network, and the second addressing zone uses so-called "private" specific local addresses allocated independently of the public addresses.

The solution described relies on the assumption according to which the Internet network implements addresses in the format of the V4 IP protocol.

When a machine of the second addressing zone (private) wishes to establish a connection to a machine of the first addressing zone (Internet), the conventional NAT function is simply implemented. The succession of the corresponding conventional steps will therefore not be described here.

The public domain, or first addressing zone, is understood here to include machines which would be contained in private domains linked to the Internet other than the private domain in respect of which the invention is implemented. What matters is that a public address (temporary or permanent) be allocated to these machines.

Figure 1:
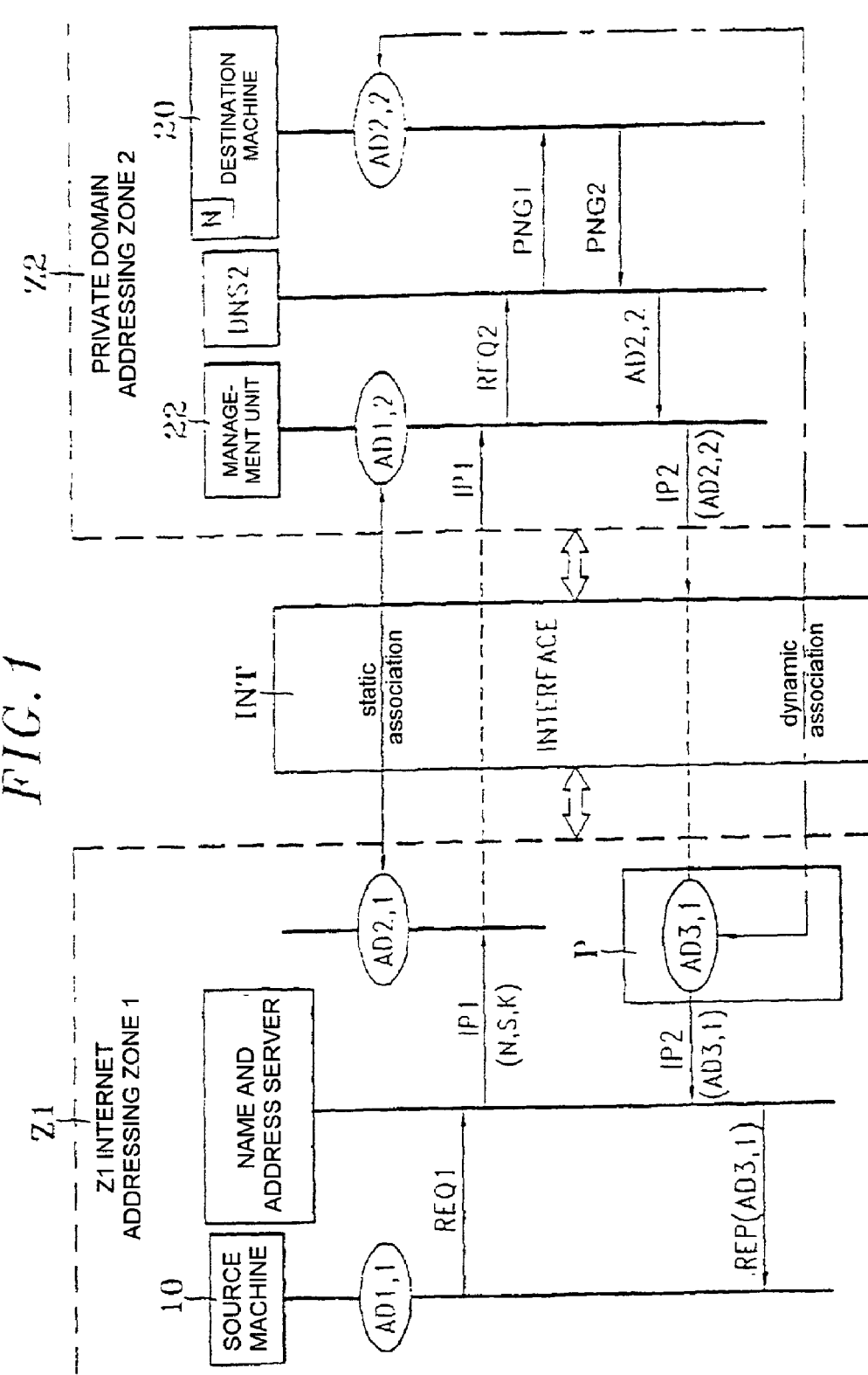
FIG. 1 diagrammatically illustrates various entities which co-operate to implement the addressing method of the invention, as well as messages exchanged by these entities in the course of the successive steps of the addressing method of the invention, in a particular embodiment.

As shown by FIG. 1, the invention is intended to allow communication from a "source" machine 10, situated in the public domain Z1, to a "destination" machine 20, situated in the private domain Z2.

In a conventional manner, the source machine 10 firstly searches for a match between the name N of the destination machine 20, which it knows, and the address of this machine 20.

To do this, in a manner known per se, the source machine 10, whose public address is AD1,1, transmits an address provision request REQ1 to a name and address server DNS1 situated in the zone Z1.

The request REQ1 exhibits a customary form, with in particular the source address AD1,1 and the name N of the destination machine, which name is for example of the type "toto.ft.fr".

As shown by FIG. 1, the name and address server DNS1 then transmits a first data packet IP1 to a second address AD2,1 of the zone Z1, the public address known to the server DNS1.

The server DNS1 identifies, on the basis of all or part of the name N, that the request relates to the relevant private domain. It can for example contain a table indicating that the names terminate with the suffix "ft.fr" relating to the relevant private domain, so that the requests REQ1 comprising such names have to form the subject of the transmission of a packet IP1 to the address AD2,1.

The packet IP1 is destined for a management unit 22 situated in the second addressing zone Z2 of the private network. A private address AD1,2 is assigned in the zone Z2 to the management unit 22.

The packet IP1 exhibits a conventional IP structure and contains in particular the public address of the name and address server DNS1 as source address, the public address AD2,1 as destination address, and in its data part ("payload"), the name N of the destination machine, for example "toto.ft.fr".

As an option, the packet IP1 can also contain, for synchronization purposes, a sequence number S in the form of a predetermined number of bits and/or, for security purposes, a public or private authentication key K associated with a data enciphering and/or electronic signature algorithm.

The second address AD2,1 of the zone Z1 is known both to the name and address server DNS1 and to an interface INT, a basic function of which consists in effecting the translation of addresses between the zones Z1 and Z2.

Advantageously, the address translation function effected by the INT interface is carried out by a router of conventional type, this requiring no modification of the router. Nevertheless, as a variant, the interface INT can form an innate entity, independent of the router.

When the INT interface receives the packet IP1 sent to the public address AD2,1, it retransmits it to the management unit 22, to its private address AD1,2.

Thereafter, the management unit 22 transmits a request REQ2 to a name and address server of conventional type DNS2 of the zone Z2, so as to ascertain the match between the name "toto.ft.fr" of the destination machine 20 and its private address AD2,2. The response to the request REQ2 therefore contains a private address, for example of the type "a.b.c.d", a, b, c and d designating decimal numbers, according to the customary format of IP addresses. Consider arbitrarily "10.10.10.4" the private address corresponding to the machine "toto.ft.fr".

As a variant, the functions catered for by the name and address server DNS2 and by the management unit 22 can be brought together into a single module. In this case, the request step REQ2 can be dispensed with and the single module obtains the private address "10.10.10.4" directly.

As an option, the management unit 22 and/or the server DNS2 can interrogate the destination machine 20 at the address AD2,2 so as to ascertain whether it is present on the private network, that is to say active and connected (message PNG1 of FIG. 1). If the machine 20 is present, it responds with an acknowledgement message PNG2.

Thereafter, the management unit 22 sends the interface INT a second packet IP, denoted IP2, containing as source address the private address AD2,2, here "10.10.10.4", of the destination machine "toto.ft.fr", and as destination address the public address of the name and address server DNS1 of the zone Z1.

The data part of the second packet IP2 borrows elements of the first packet IP1, such as the name of the source machine 10 and the sequence number S for synchronization.

When it receives the second packet IP2, the interface INT replaces the source address AD2,2 with a third address AD3,1 of the zone Z1.

The third address AD3,1 forms part of a list P of IP addresses of the zone Z1, allotted to the zone Z2. Consider arbitrarily AD3,1="192.4.147.2". The interface INT creates a dynamic association, for example with the aid of a conventional NAT function, between the address AD3,1 and the source address AD2,2 which it has received, and retransmits the packet IP2 with the address AD3,1 instead of the address AD2,2 to the name and address server DNS1.

Therefore, the name and address server DNS1, on receipt of the packet IP2, extracts therefrom the third address AD3,1 and includes it in a response REP to the address provision request REQ1 originating initially from the source machine 10 of the zone Z1, by way of the address AD1,1.

The response REP contains, in a manner known per se, a datum indicative of the minimum duration of validity of the dynamic association between the addresses AD3,1 and AD2,2. This datum is dependent on the configuration parameters of the interface INT, that is to say of the router in the case where the functions of the interface are carried out by a router.

The divert time cue (TTL field according to the IP protocol) included by the server DNS1 in the response REP can thus represent the minimum duration of the dynamic match between the private address AD2,2 of the destination machine and its temporary public address AD3,1. This cue is provided by the NAT function of the interface INT.

The source machine 10 of the zone Z1 is then able to establish a connection with the destination machine 20 of the zone Z2, by transmitting to the address AD3,1. The NAT function of the interface INT will cater for the address translations required.

Figure 2:
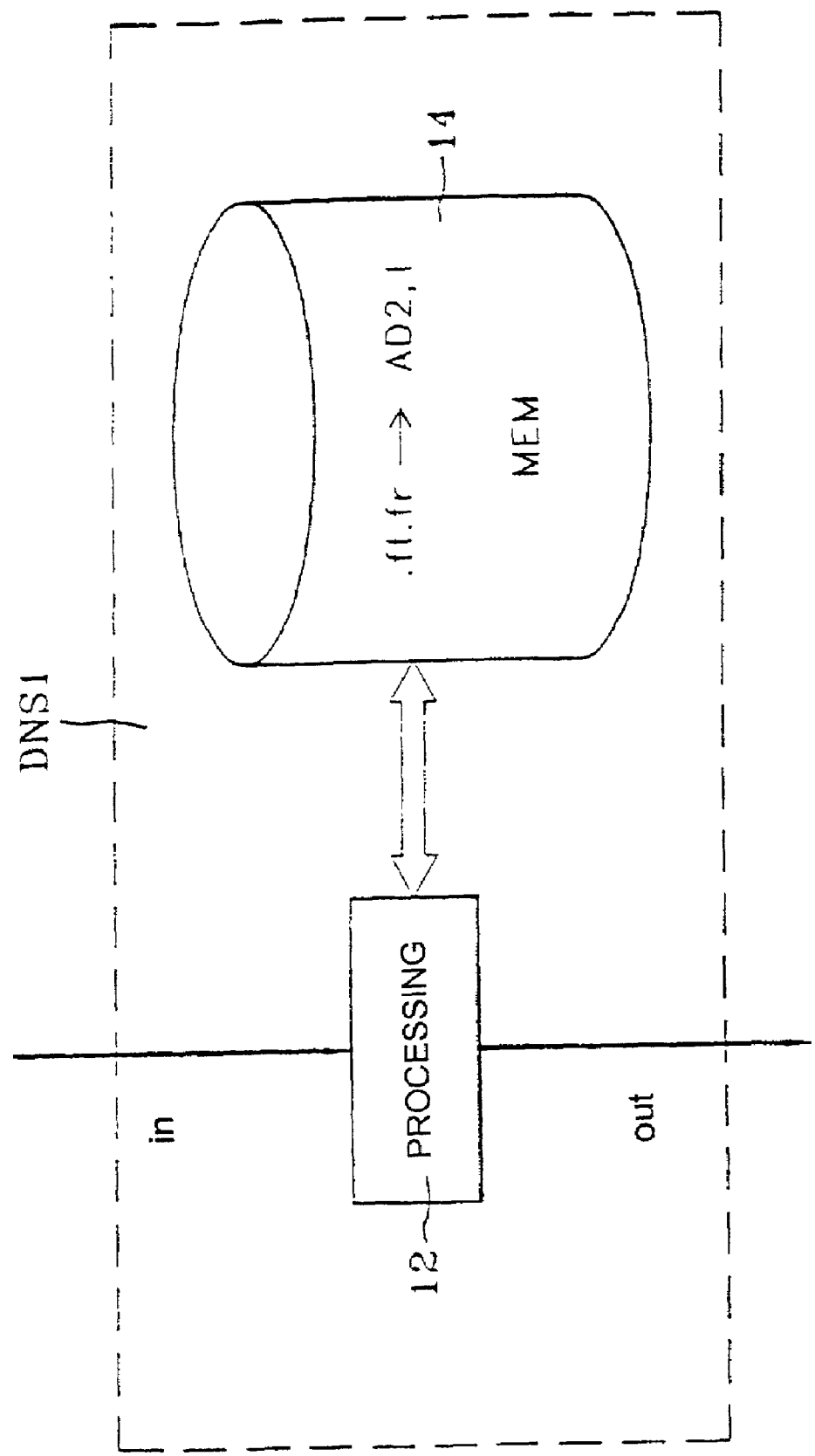
FIG. 2 diagrammatically represents a name and address server according to the invention, in a particular embodiment.

FIG. 2 diagrammatically represents the overall structure of a name and address server such as the server DNS1, capable of co-operating with a management unit with a view to implementing a method of addressing of the type described hereinabove.

In the particular embodiment represented in FIG. 2, the server DNS1 comprises a data processing module 12 which carries out in a conventional manner the association between machine names contained in incoming packets and IP addresses emanating from match-up tables stored in a memory 14, which are sent back in response messages. When the name pertains to the private domain Z2 to which the invention is applied, the module 12 sends the packet IP1 to the public address AD2,1 of the zone Z1, obtained from the memory 14. Thereafter, when the module 12 receives the packet IP2, which comprises the address AD3,1 associated in a dynamic manner with the address AD2,2 of the destination machine 20, it includes this address AD3,1 in the response REP to the address provision request REQ1 originating from the address AD1,1 of the source machine 10.

The invention claimed is:

1. Method of addressing in a digital telecommunications network having first and second addressing zones between which an interface caters for address translations, comprising the following steps:

a name and address server situated in the first addressing zone receives, origination from a first address of the first zone, assigned to a source machine, a request to provide an address in relation to the name of a destination machine;

if the destination machine is situated in the second addressing zone, the name and address server sends to a second address of the first zone a first packet containing at least the said name of destination machine;

the interface retransmits the first packet to a first address of the second zone, assigned to a management unit and associated in a static manner with the second address of the first zone;

the management unit obtains a second address of the second zone assigned to the destination machine whose name appears in the first packet;

the management unit sends the interface a second packet destined for the name and address server comprising the second address of the second zone as origin address;

the interface transmits the second packet to the name and address server while replacing the origin address by a third address of the first zone, forming part of a list of addresses of the first zone allotted to the second addressing zone and associated in a dynamic manner with the second address of the second zone;

the name and address receives the second packet, extracts therefrom the third address forming the origin address, and includes this third address in a response to the address provision returned to the first address of the first zone.

2. Method according to claim 1, wherein the said first packet sent by the name and address server to the said second address of the first zone contains, in addition to the said name of destination machine, a sequence number and/or an authentication key.

3. Method according to claim 1, wherein the name and address server includes in the response a lifetime cue representing a minimum duration of dynamic match between the said second address of the second zone and the said third address of the first zone.

4. Method according to claim 1, wherein the management unit or a second name and address server associated with this unit interrogates the destination machine after having obtained the second address of the second zone so as to confirm the presence of this destination machine before sending the second packet to the interface.

* * * * *